United States Patent
Přikryl et al.

(10) Patent No.: US 9,235,670 B2
(45) Date of Patent: Jan. 12, 2016

(54) METHOD AND AN APPARATUS FOR AUTOMATIC GENERATION OF VERIFICATION ENVIRONMENT FOR PROCESSOR DESIGN AND VERIFICATION

(71) Applicant: Codasip s.r.o., Brno (CZ)

(72) Inventors: Zdeněk Přikryl, Brno (CZ); Marcela Šimková, Brno (SK); Karel Masařík, Brno (CZ)

(73) Assignee: CODASIP, s.r.o., Brno (CZ)

( * ) Notice: Subject to any disclaimer, the term of this patent is extended or adjusted under 35 U.S.C. 154(b) by 80 days.

(21) Appl. No.: 14/183,498

(22) Filed: Feb. 18, 2014

(65) Prior Publication Data

US 2015/0234966 A1 Aug. 20, 2015

(51) Int. Cl.
*G06F 9/455* (2006.01)
*G06F 17/50* (2006.01)

(52) U.S. Cl.
CPC ........ *G06F 17/5045* (2013.01); *G06F 17/5009* (2013.01)

(58) Field of Classification Search
CPC .................................................. G06F 17/5022
USPC .......................................................... 716/106
See application file for complete search history.

(56) References Cited

U.S. PATENT DOCUMENTS

| | | | |
|---|---|---|---|
| 6,385,757 B1 * | 5/2002 | Gupta et al. .................. | 716/102 |
| 7,386,827 B1 * | 6/2008 | Zhu et al. ...................... | 716/103 |
| 8,006,204 B2 * | 8/2011 | Killian et al. ................. | 716/100 |
| 8,423,929 B2 * | 4/2013 | Pandurangan et al. ....... | 716/100 |
| 8,522,221 B1 * | 8/2013 | Braun et al. .................. | 717/146 |
| 2002/0002698 A1 * | 1/2002 | Hekmatpour .................... | 716/4 |
| 2005/0086565 A1 * | 4/2005 | Thompson et al. ........... | 714/741 |
| 2005/0102596 A1 * | 5/2005 | Hekmatpour ................. | 714/741 |
| 2013/0318486 A1 * | 11/2013 | Sasaki ........................... | 716/106 |

* cited by examiner

*Primary Examiner* — Suresh Memula
(74) *Attorney, Agent, or Firm* — pkalousek.ip

(57) ABSTRACT

A method and a system embodying the method for automatic generation of a verification environment, comprising providing a first model of an application-specific instruction-set processor; providing a second model of the application-specific instruction-set processor; and generating automatically the verification environment from the first model and the second model is disclosed.

23 Claims, 2 Drawing Sheets

METHOD AND AN APPARATUS FOR AUTOMATIC GENERATION OF VERIFICATION ENVIRONMENT FOR PROCESSOR DESIGN AND VERIFICATION

BACKGROUND

1. Field

The present invention relates to processor design. More particularly, this invention is directed toward automatic generation of verification environment for processor design and verification.

2. Description of Related Technology

Electronic devices play an important role in our daily life, being used in various areas, e.g., entertainment (game consoles), communication (mobile phones), health care (diagnostic equipment), and the like. The functionality of such devices may use dedicated hardware units or processors. Dedicated hardware units may achieve high performance, low power consumption, and are usually employed in specialized devices. In contrast, their specialized function is disadvantageous in devices requiring changes due to, e.g., changes to the specifications, transition to the new standard, and similar events, where processors are preferred due to their programmability.

General purpose processor may be characterized as a processor which is not tied to or integrated with a particular application domain or piece of software. This flexibility comes with at the expense of size of an area on a chip, power consumption, and processing efficiency when execution a specialized application.

In contrast, application-specific instruction-set processor (ASIP) is a processor designed for applications, having specific requirements. By means of an example mobile devices, e.g., mobile phones require low power consumption, while requiring only specialized processing capability. Because the requirements of a target application are known, the design can be optimized for the requirement, e.g., low power consumption, size of an area on a chip, adequate processing efficiency, and other requirements known to a person of ordinary skills in the art. The optimization is achieved by implementing some software functionality in hardware and adapting the instruction set to the target application.

Development of an ASIP starts with determining requirements for the ASIP in accordance with the target application; the requirements being summarized in ASIP specifications. Traditionally, the development comprises several iterations usually done manually. In the first step of the iteration, tools for programming and estimation of the ASIP performance are developed from the ASIP specifications. Such tools may comprise e.g., higher programming language compiler, assembler, simulator, or profiler. These tools serve for a development of an instruction set. First, the required instructions are identified, by compiling the target application to be executed on the ASIP from the higher programming language in which the application is initially written. In this aspect, the term compiling is understood as translation of the higher programming language application into executable file, by means of a compiler, an assembler and a linker. The executable file is then executed by the ASIP. The simulator or profiler of the ASIP simulates the application compiled into the executable file so that debugging may be carried out before the ASIP design is committed to a physical processor implementation (target hardware technology), e.g., on a silicon chip, or a Field Programmable Gate Array (FPGA). The results of the simulation/profiling may indicate a need to change/optimize the instruction set and/or a need to change the ASIP specifications. Of course, any such change requires another iteration, changing of all the tools, a task demanding on both time and resources, since the changes are carried out manually.

In the next step, after the instruction set was stabilized, the optimal micro-architecture is designed in accordance with the ASIP specifications. Micro-architecture is an implementation of an architecture, wherein the architecture comprises an instruction set, registers and other components exposed to the programmer. Consequently, the micro-architecture design comprises design decision regarding, e.g., the number and types of Arithmetic Logic Units (ALUs), how many stages a pipeline has, connection to a memory subsystem, registers, and other design decision known to a person of ordinary skill in the art. After the micro-architecture is designed, the instruction set and the micro-architecture is re-evaluated in view of the target application and target hardware technology. This re-evaluation may affect only the micro-architecture, only the instruction set, or both. As mentioned supra, any such change requires changes of all the tools.

The above-mentioned complexity resulted in development of Electronic Design Automation (EDA) tools, automating the above-described tasks. One category of the EDA tools comprises tools for ASIP design. These tools eliminate or at least mitigate the design complexity, allow shorter development time, and deliver the resulting product in higher quality.

A class of the EDA tools is focused on generating programming and simulation tools, e.g., high level programming language (HLL) compiler, assembler, simulators, debugger, profiler, as well as hardware description in hardware description languages, e.g., VHSIC Hardware Description Language (VHDL), Verilog, and other languages known to a person of ordinary skills in the art in accordance with the ASIP specifications. To describe an instruction set and micro-architecture of an ASIP, Architecture Description Languages (ADL) have been developed. ADL languages can be divided into two main categories. The first category of languages allows modification of a limited part of the ASIP; the un-modifiable part is given by a template. An example of an ADL using templates is a Tensilica Instruction Extension (TIE), which is further limited to customization of the Xtensa processor core architecture. The second category allows to describe and modify all parts of ASIP. Examples of this category are Language for Instruction Set Architectures (LISA), nML, Codasip Architecture Language (CodAL).

The latter category of languages provides two levels of abstraction. The first level of abstraction, simpler and targeted at design space exploration (DSE), i.e., exploring optimal instruction set, is the instruction accurate description (IA). IA model is primarily aimed at the description of instruction set architecture (ISA) and defines instructions without any ties to the micro-architecture or target hardware technology. The hardware cannot be generated from the IA model, but is suitable for generating at least some of the programming and simulation tools.

The second level of abstraction, the cycle accurate (CA), is targeted at micro-architecture design for the target hardware technology. From the CA model a processor hardware description is generated in the hardware description languages.

As disclosed supra, the traditional design approach is to use the IA model to develop the description of instruction set architecture. The IA model is either designed by the user of the EDA tool, or is supplied by the EDA tool provider. Alternatively, the IA model may be produced by/for the specific EDA tool and supplied by a third party. Then, elements of the hardware description are added to the IA model, until the IA model morphs into the CA model, which is then used to generate the hardware description in hardware description languages. Once the hardware description has been generated, the model may be tested.

This traditional design approach has serious drawbacks. Since there is only single model used as an input for generating both the programming and simulation tools and the hardware description, the programming and simulation tools and the hardware description contain the same potential errors. As a consequence, testing and/or verification cannot find the errors, because the behavior of the hardware description and the simulators is the same. Therefore, a reference model for verification, additional simulators for testing, and/or a verification environment need to be created manually, which is time and resource demanding task. As discussed supra, an error found during testing may require restart of the entire cycle, starting with re-development of the IA model. Furthermore, the result of testing is limited to a binary outcome—a specific test either passed or failed. Thus, additional effort is needed to investigate and determine, what caused the failure.

Additionally, the single model may require separate and different descriptions for at least some of the programming and simulation tools. By means of an example, a description of a compiler is separate and different from a description of a simulator. Therefore, in case that a change/optimization is required for the programming and simulation tools, all descriptions have to be changed, which is both labor intensive and has a potential to introduce errors due to inconsistencies between descriptions.

Accordingly, there is a need in the art for an improvement in verification environment of the design process, providing a solution to the above identified problems, as well as additional advantages. An automatic processor design and verification that may use such verification environment is disclosed in co-pending application Ser. No. 14/183,482, filed on Feb. 18, 2014, by Zdenek Prikryl, et al., entitled A METHOD AND AN APPARATUS FOR AUTOMATIC PROCESSOR DESIGN AND VERIFICATION

SUMMARY

In an aspect of the disclosure, an apparatus and a method for automatic generation of verification environment according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
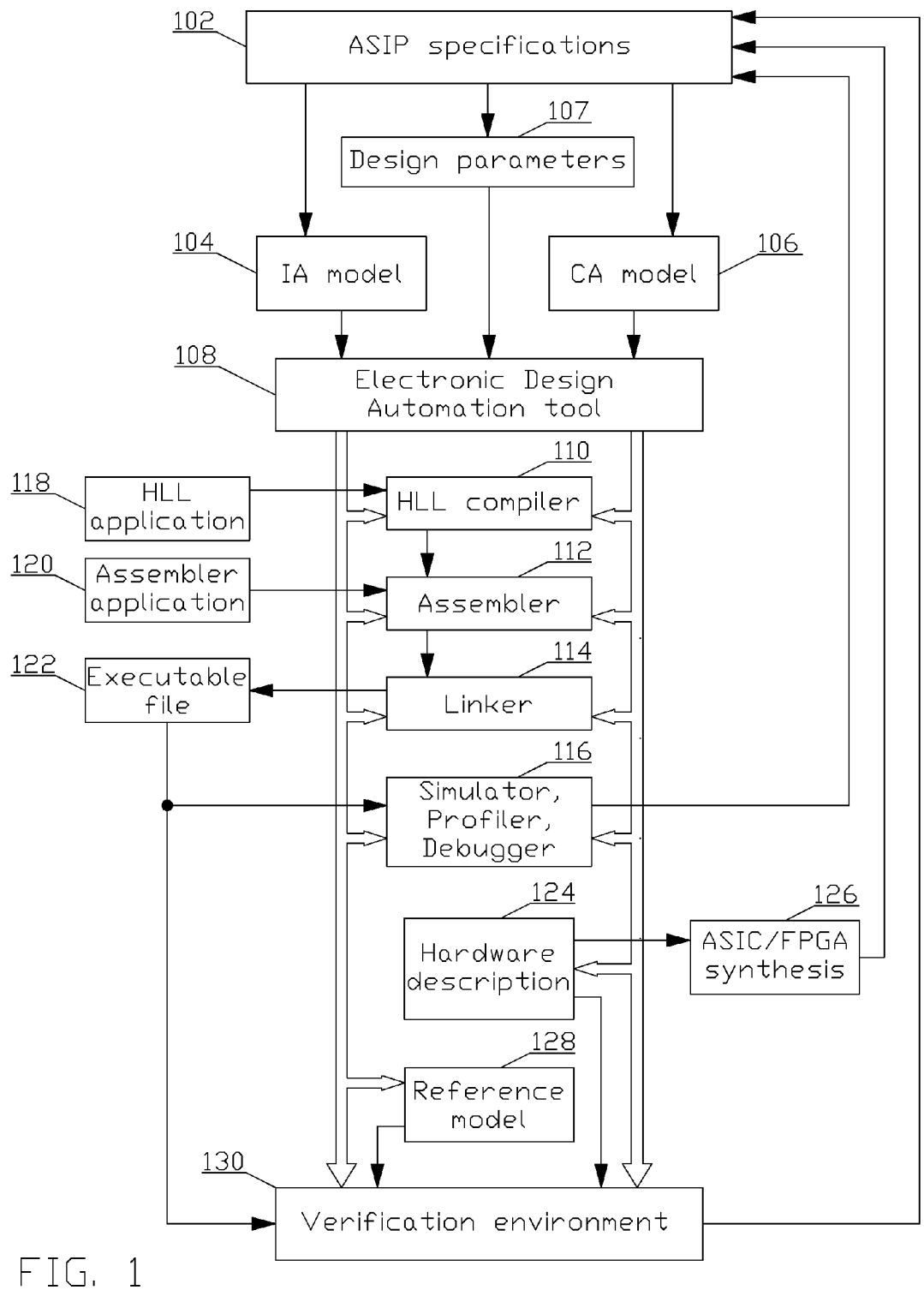
FIG. 1 depicts a conceptual structure and information flow among elements of the conceptual structure for automatic design and verification of an application-specific instruction-set processor in accordance with an aspect of this disclosure.
Figure 2:
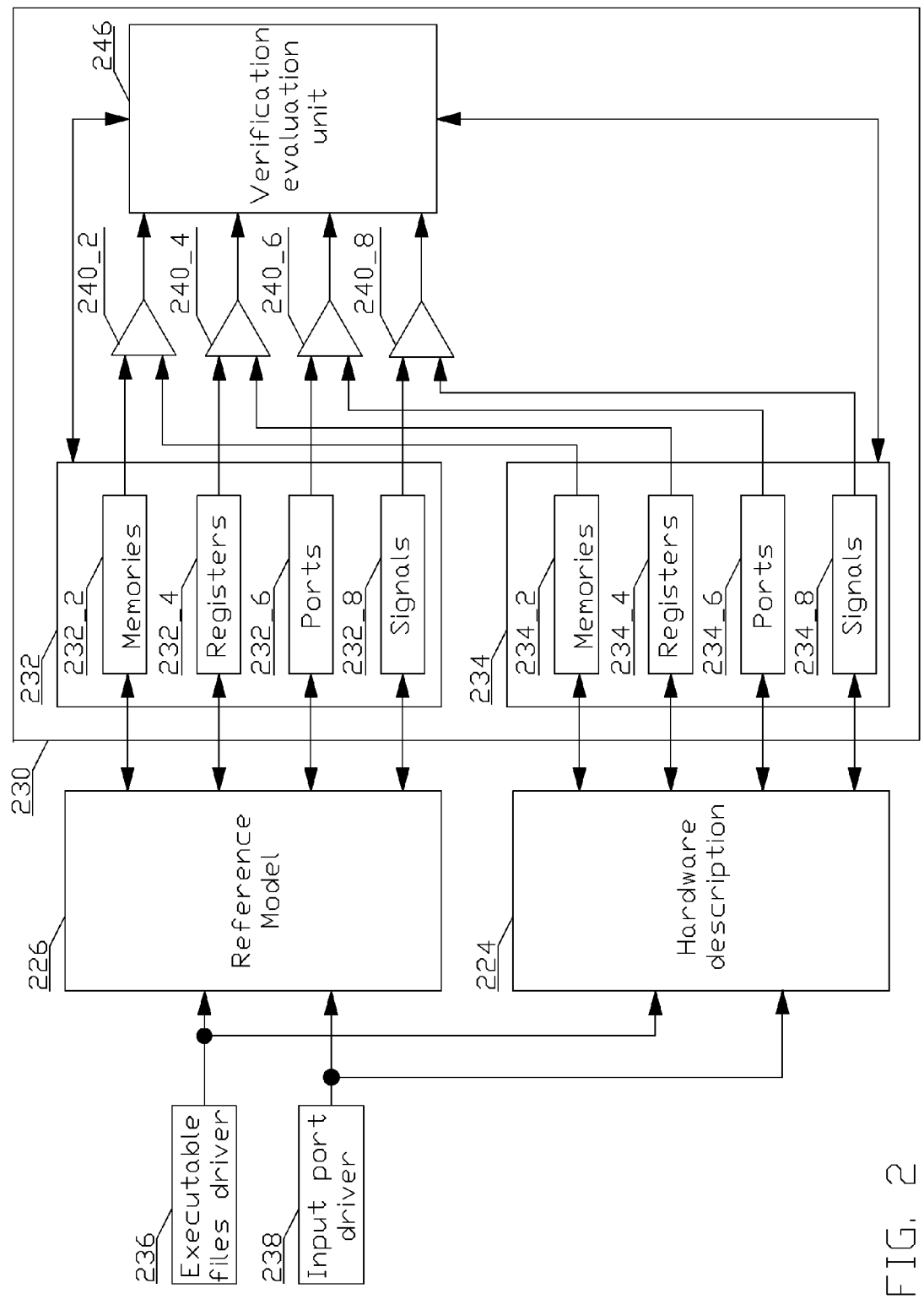
FIG. 2 depicts a conceptual structure and information flow among elements of the conceptual structure for verification of an application-specific instruction-set processor in accordance with an aspect of this disclosure.

The description of like structural elements among the figures, is not repeated, the like elements have reference numerals differing by an integer multiple of 100, i.e., reference numeral 100 in FIG. 1 becomes reference numeral 200 in FIG. 2; unless differences and/or alternative aspects are explicitly noted. An expression "_X" in a reference indicates an instance of an element of a drawing where helpful for better understanding. A double line indicates entities generated by the entity originating the double line; any unreferenced single or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1 depicts a conceptual structure and information flow among elements of the conceptual structure for design and verification of an application-specific instruction-set processor. The elements comprise hardware or software entities implementing the blocks and/or the block's functionality.

The design process starts by determining requirements for a newly developed ASIP in accordance with the target application, resulting in ASIP specifications 102, which determine tools and ASIP design generated by an EDA tool as disclosed infra. Such ASIP specifications 102 comprise a separate description of an instruction set specifications and a micro-architecture specifications. The ASIP specifications 102 may be in a form of one or more text files, e.g., one file comprising the specifications for the instruction set, another file comprising the specifications for the micro-architecture, drawings, or any other form known to a person of ordinary skills in the art. The specifications may change during the design process based on results of ASIP simulation, synthesis, and/or verification.

In accordance with the ASIP specifications 102, an Instruction Accurate (IA) model 104 and a Cycle Accurate (CA) model 106 are designed. In an aspect the design comprises a green-field design, i.e., design wherein the model(s) are designed by the user of the EDA tool 108. In another aspect the models are supplied by the EDA tool 108 provider and modified by the user in accordance with the ASIP specifications 102. In yet another aspect, the IA model 104 and/or the CA model 106 may be produced by/for the specific EDA tool 108 and supplied by a third party. The IA model 104 and/or the CA model 106 comprise inputs to an EDA tool 108. Therefore, once the IA model 104 and/or the CA model 106 are designed, the EDA tool 108 may be used for the ASIP design. The EDA tool 108 is agnostic to whether the IA model 104 and the CA model 106 are template-based or fully configurable.

Additional inputs to the EDA tool 108 may comprise optional design parameters 107 influencing the behavior of the EDA tool 108. By means of an example, such parameters may comprise e.g., a parameter instructing the EDA tool 108 to prioritize low power consumption over other properties, e.g., processing efficiency. By means of another example, a parameter may provide additional information about the ASIP micro-architecture.

The EDA tool 108, in accordance with the IA model 104 or the CA model 106, or a combination of both the IA model 104 and the CA model 106, and the optional parameters 107 automatically generates the programming and simulation tools, such as an HLL compiler 110, an assembler 112, a linker 114, a simulator, a profiler and a debugger, collectively shown as a reference 116, and other tools known to a person of ordinary skills in the art. Thus, a tool, e.g., the HLL compiler 110 may be generated from the IA model 104, while another tool, e.g., the simulator, profiler and debugger 116 may be generated from the CA model 106. In an aspect, the linker 114 may be a stand-alone tool, common to all IA models 104 and/or the CA models 106. In another aspect, the linker 114 is generated by the EDA tool 108, and accordingly is unique for the IA model 104 and/or the CA model 106. The unique linker 114 may further improve the executable file 122, e.g., by code size optimization.

Once the programming and simulation tools are generated, in one aspect, application(s) to be executed on the ASIP are provided in high level language (HLL) 118. The HLL applications 118 may comprise e.g., application(s) written by the user, application(s) supplied in a test suites, application(s) testing benchmarks, or any other application sources known to a person of ordinary skills in the art. The HLL may be e.g., C language, C++ language, Object Pascal, or any other language known to a person of ordinary skills in the art. The compiler 110 translates the HLL applications(s) 118 into a symbolic instruction language, i.e., an assembly language representation of the application(s).

In another aspect, the user may choose to provide the application to be executed on the ASIP directly in assembly language 120. In yet another aspect, a random generator of assembly language application(s) may be used. The different aspects are not mutually exclusive in that the EDA tool 108 is configured to enable either aspect and the user may choose one of aspects.

The assembly language representation of the application(s) 120, obtained by either aspect supra, is provided to the assembler 112, which produces a binary representation of the application(s) in a form of one or more object files. The one or more object files are provided to the linker 114, which accepts the one or more object files and links, i.e., combines the one or more object files into a single executable file 122.

The executable file 122 is provided to the simulator, the profiler, and/or the debugger 116, the tools enabling executable file 122 simulation. The simulator duplicates, i.e., simulates the functions of the ASIP so that the simulated behavior closely resembles the behavior of the ASIP. The profiler monitors and analyses the different functions of the processor during the executable file execution, and is able to output summary of the events observed; stream of recorded events, and any other output known to a person of ordinary skills in the art. By means of an example, such an output may comprise information like list of executed instructions, pipeline statistics, and other output information known to a person of ordinary skills in the art. The output information is then used to update the ASIP specifications 102. The debugger enables detailed examination of values of different components of the processor, i.e., input/output ports, registers, memory, and other components known to a person of ordinary skills in the art, during the execution of the executable file. A person of ordinary skills in the art will appreciate that the simulator, the profiler, and the debugger were described separately for explanation of the functions; in an aspect the functions may be combined, e.g., a debugger may be combined with profiler in a single tool component.

After simulation, debugging, or profiling, the produced output results are reviewed by the user and changes to ASIP specifications 102 may be made based on the output results. When changes to ASIP specifications 102 and/or the design parameters 107 are needed, the changes are then used to change the IA model 104 and/or the CA model 106, and the process of the EDA tool 108 automatically generating the programming and simulation tools and subsequent evaluation of the programming and simulation tools by simulation, debugging, or profiling is repeated until the simulation and profiling provides satisfactory outputs results. Because a single description for generating all the programming and simulation tools is used in the IA model 104 and/or the CA model 106, the design of the IA model 104 and/or the CA model 106 is simplified because a correction to the single description used for programming and simulation tools, re-generates all the programming and simulation tools.

As soon as the CA model 106 is available, a hardware description 124 may be generated from the CA model 106. The hardware description 124 comprises generated hardware implementation in the language for hardware description and a relevant test environment (test-benches). The hardware description languages may comprise, e.g., VHSIC Hardware Description Language (VHDL), SystemVerilog, or other hardware languages known to a person of ordinary skills in the art. The test environment represents an envelope, which is used by developers for rapid testing. The hardware description 124 is provided to an Application Specific Integrated Circuit or a Field Programmable Gate Array (ASIC/FPGA) synthesis module 126.

The ASIC/FPGA synthesis module 126 comprises third-party tools, e.g., Xilinx ISE, Mentor Graphics's Precision RTL, and other tools known to a person of ordinary skills in the art. The ASIC/FPGA synthesis module 126 takes hardware description 124 and creates a description for the target hardware technology, e.g., silicon chip, or an FPGA. The hardware description 124 together with the ASIC/FPGA synthesis module 126 carry out implementation of the CA model 106. The results of the implementation are reviewed by the user and changes to ASIP specifications 102 may be made based on the output results. When changes to ASIP specifications 102 are needed, the changes are then used to change the IA model 104 and/or the CA model 106 and the process is repeated until the simulation, profiling and/or implementation results provide satisfactory output results.

The final IA model 104 and the final CA model 106, i.e., the models, which yield the satisfactory output results, are input into the EDA tool 108, which generates a hardware description 124 and a reference model 128 respectively.

The hardware description 124 provides during a verification process values of simulated hardware components of the designed ASIP. Because the hardware description 124 represents the micro-architecture of the ASIP, the hardware description 124 is generated from the final CA model 106.

The reference model 128 prepares expected outputs for the designed ASIP. The reference model 128 may comprise several forms, e.g., a shared library, a description in SystemVerilog language, and other forms known to a person of ordinary skill in the art. The reference model 128 is generated from the final IA model 104. Were the reference model 128 be generated from the final CA model 106, a potential error/irregularity existing in the final CA model 106 would be reflected in both the generated hardware description 124 and the reference model 128; consequently, the verification process would be unable to discover this error/irregularity.

Once the EDA tool 108 generates hardware description 124 and the reference model 128, the EDA tool 108 generates the verification environment 130 from the final IA model 104 and the final CA model 106. The generated verification environment 130 comprises a program specifying usage of a set of tools, libraries and/or functions designed to support verification. In particular, the verification environment 130 program creates instances of the drivers and conceptual structures, defines relationships there-between, as disclosed in reference to FIG. 2 infra. A driver is a software program that operates and/or controls a particular device/unit within a verification environment that is attached to the driver. The verification environment 130 then instructs the set of tools, libraries and/or functions how to access the drivers, conceptual structures, and reference model 128, the generated hardware description 124, and how and what verification tests to execute. By means of an example, such a set of tools, libraries and/or functions may comprise tools, libraries and/or functions supplied by the EDA tool 108, or third party tools, e.g., Universal Verification Methodology (UVM) libraries and tools provided in ModelSim by Mentor Graphics, and other tools and functions known to a person of ordinary skills in the art.

The source applications, either HLL applications 118 or assembler applications 120, for the executable file 122 are provided by the user, or the source applications may be generated and provided by the EDA tool 108. The executable file 122 is then generated by the programming tools, i.e., HLL applications are translated by the HLL compiler 110, assembler applications are translated by the assembler 112, and object files are linked by the linker 114. Because the programming and simulation tools are generated from both the final IA model 104 and the final CA model 106 and the EDA tool 108 extracts parameters describing the micro-architecture from the final CA model 106, the programming tools are aware of a micro-architecture of the ASIP. Therefore, the verification environment 130 is also able to verify that the programming tools are correctly aware of the micro-architecture of the ASIP. Such a feature is useful when some handling of data, control, or structural hazards is offloaded from the ASIP micro-architecture to the HLL compiler 110. Since the HLL compiler 110 is generated by the EDA tool 108, the user needs to ascertain that the HLL compiler 110 translates HLL application correctly with regards to offloaded data, control, or structural hazards.

By means of an example, consider that the ASIP microarchitecture is designed not to handle data-hazards, i.e., the CA model 106 does not comprise structure for data-hazards handling, instead the data-hazard handling is offloaded to the HLL compiler 110. The EDA tool 108 thus must generate the HLL compiler 110 capable of creating correct output assembler file and inserting no-operation or any other necessary instruction, so that the assembler file does not contain any data-hazards with regards to ASIP micro-architecture.

As disclosed above, when both the IA model 104 and the CA model 106 are available, the EDA tool 108 is made aware of parameters of the ASIP micro-architecture, i.e., the lack of structure for data-hazards, by the EDA tool 108 extracting the parameters describing the micro-architecture form the CA model 106. However, often an IA model 104 and CA model 106 are developed concurrently; consequently, the full CA model 106 may not be available during the development of software and programming tools. To enable development of the software and programming tools aware of the ASIP micro-architecture, parameters of the ASIP micro-architecture are provided by the user via optional design parameters 107. In either case, the programming tools are aware of a micro-architecture of ASIP; consequently, the verification environment 130 is able to verify whether the HLL compiler 110 handles the data-hazards correctly or not.

The generated hardware description 124, the reference model 128, and the executable file 122 are provided to the generated verification environment 130. The generated verification environment carries a verification of the ASIP design by verifying the generated hardware description 124 against the reference model 128.

FIG. 2 depicts a conceptual structure and information flow among elements of the conceptual structure for automatic verification of an application-specific instruction-set processor in accordance with an aspect of this disclosure. The elements comprise hardware or software entities implementing the blocks and/or the block's functionality. To further clarify the relationship between certain elements of the conceptual structure of FIG. 1 as referenced in FIG. 2 and associated text, references of structural elements of FIG. 1, are in parenthesis.

As disclosed supra, the verification environment 230 is a program comprising instructions for the set of tools, libraries and/or functions designed to support verification to create drivers, structures, interfaces to models to be verified, and relations there-between. Thus, on the conceptual level, the verification environment 230 is divided into a predicted results unit 232, and a monitor unit 234. The predicted results unit 232, generated from the IA model (104), accesses values of simulated hardware components characterizing the ASIP as produced by the reference model 226 during the verification process. These values may also be stored in the predicted results unit 232 for further evaluation. The monitor unit 234, generated from the CA model (106), accesses values of the simulated hardware components characterizing the ASIP as produced by the generated hardware description 224 during the verification process. These values may also be stored in the monitor unit 234 for further evaluation.

Each of the predicted results unit 232 and the monitor unit 234 comprises at least one simulated hardware component characterizing the ASIP, known to a person of ordinary skills in the art. In an aspect, the at least one simulated hardware component comprises at least one of memories 232_2, 234_2, registers 232_4, 234_4 (including registr files), output ports 232_6, 234_6, signals 232_8, 234_8. A memory is a simulated representation of any physical devices used to store instructions and/or data on a temporary or permanent basis as will be implemented in the ASIP. A register is a simulated representation of a small amount of storage being (typically) addressed by mechanisms other than the memory and can be thus accessed more quickly. The registers 232_4, 234_4 comprise architectural registers, i.e., registers exposed to the programmer. A port is a simulated representation of any physical input/output port used to pass information to other components connected to ASIP. A signal is a simulated representation of a path along which information flows among components of the ASIP, e.g., a wire.

To enable execution of an executable file by both the reference model 226 and the generated hardware description 224, the EDA tool (108) further generates an executable file driver 236. Furthermore, some executable files require that values of input ports are input to both the reference model 226 and the generated hardware description 224. Such an input port value may comprise an interrupt, data to be processed, and/or any other input known to a person of ordinary skills in the art. Consequently the EDA tool (108) further generates an optional input port driver 238.

Once the file to be executed and, optionally, the values of input ports are input into both the reference model 226 and the generated hardware description 224, the execution is started by user or script. Throughout the execution, values of the memories 232_2, the registers 232_4, the output ports 232_6, and the signals 232_8 produced by the reference model 226 are stored in the reference model 226 or the predicted results unit 232, and values of the memories 234_2, the registers 234_4, the output ports 234_6, and the signals 234_8 produced by the generated hardware description 224, are stored in the generated hardware description 224 or the monitor unit 234.

When the execution finishes, the values from the memories 232_2 and 234_2 are provided to a comparator 240_2. In an aspect, the predicted results unit 232 accesses the reference model 226, takes a snapshot of the values in the memories 232_2 and the monitor unit 234 accesses the generated hardware description 224 and takes a snapshot of the values in the memories 234_2. In another aspect, the values in the memories 232_2 are stored at predicted results unit 232 and the values in the memories 234_2 are stored at the monitor unit 234.

The comparator 240_2 executes a function that steps through the values in corresponding memories 232_2 and 234_2, compares the values and provides a result of the comparison to the verification evaluation unit 246.

Identical procedure is used to obtain values of the registers 232_4 and 234_4, which are provided to a comparator 240_4. The comparator 240_4 executes a function that steps through the values in corresponding registers 232_4 and 234_4, compares the values and provides a result of the comparison to the verification evaluation unit 246.

Identical procedure is used to obtain values of the signals 232_8 and 234_8, which are provided to a comparator 240_8. The comparator 240_8 executes a function that steps through the values in corresponding signals 232_8 and 234_8, compares the values and provides a result of the comparison to the verification evaluation unit 246.

Identical procedure is used to obtain values of the output ports 232_6 and 234_6. However, the comparison must be carried out differently. Instruction execution in the reference model 226 typically takes less clock cycles than the instruction execution in the generated hardware description 224; consequently the values between output ports 232_6 and 234_6 do not necessarily correspond. By means of an example; the reference model 226 may generate output ports 232_6 values 1, 0, 2, while the generated hardware description 224 generates values 0, 0, 1, 0, 0, 0, 0, 0, 2. Therefore, in an aspect, the values of output ports 232_6 and 234_6 are pre-processed to provide only the corresponding values to the comparator 240_6. In another aspect, the comparator 240_6 executes a function that pre-processes the output ports 232_6 and 234_6 to provide only the corresponding values, which are then compared. In an aspect, the EDA tool (108), determines whether the final CA model (106) comprises enough information to enable the EDA tool (108) to automatically generate the pre-processing. When the determination is affirmative, the EDA tool (108) automatically generates the pre-processing; otherwise the pre-processing must be determined by the user.

The verification evaluation unit 246 evaluates the result of the comparison. Such an evaluation may be a fail/pass. However, the user may further instruct the verification evaluation unit 246 to request from the predicted results unit 232 and monitor unit 234 a more detailed report. Such a report may provide, e.g., specific values which differ between the predicted results unit 232 and monitor unit 234; coverage of instruction sets, i.e., number of instructions that were executed; sequence of instructions that were executed and sequence of instructions which were not executed; register and memory values, and other information implemented by the verification evaluation unit 246.

The detailed report is then used to revise the ASIP specifications (102), and to change the IA model (104) and/or the CA model (106), and repeat the design and verification process.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method for automatic generation of a verification environment, comprising:
providing a first model of an application-specific instruction-set processor;

providing a second model of the application-specific instruction-set processor; and generating automatically the verification environment from the first model and the second model.

2. The method as claimed in claim 1, wherein the providing a first model of an application specific instruction-set processor comprises:

providing an instruction accurate model.

3. The method as claimed in claim 1, wherein the providing a second model of an application-specific instruction-set processor comprises:

providing a cycle accurate model.

4. The method as claimed in claim 1, wherein the generating automatically the verification environment from the first model and the second model, comprises:

generating automatically a predicted results unit from the first model;

generating automatically a monitor unit from the second model;

generating automatically at least one comparator; and generating automatically a verification evaluation unit.

5. The method as claimed in claim 4, further comprising:
generating automatically an executive file driver.

6. The method as claimed in claim 4, further comprising:
generating automatically an input port driver.

7. The method as claimed in claim 4, wherein the generating automatically a predicted results unit from the first model, comprises:

generating automatically the predicted results unit comprising at least one simulated hardware component characterizing the application-specific instruction-set processor.

8. The method as claimed in claim 7, wherein the at least one simulated hardware component characterizing the application-specific instruction-set processor comprises:

a memory;
a register;
a signal; and
a port.

9. The method as claimed in claim 4, wherein the generating automatically a monitor unit from the second model comprises:

generating automatically the monitor unit from the second model comprising at least one simulated hardware component characterizing the application-specific instruction-set processor.

10. The method as claimed in claim 9, wherein the at least one simulated hardware component characterizing the application-specific instruction-set processor comprises:

a memory;
a register;
a signal; and
a port.

11. A computer program product stored on a non-transitory computer readable media adapted to be executable to automatically generate a verification environment, comprising:

a first model of an application-specific instruction-set processor;

a second model of the application-specific instruction-set processor; and an Electronic Design Automation tool configured to generate automatically the verification environment from the first model and the second model.

12. The computer program product stored on a non-transitory computer readable media as claimed in claim 11, wherein the first model of an application-specific instruction-set processor comprises an instruction accurate model.

13. The computer program product stored on a non-transitory computer readable media as claimed in claim 11, wherein the second model of an application-specific instruction-set processor comprises a cycle accurate model.

14. The computer program product stored on a non-transitory computer readable media as claimed in claim 11, wherein the automatically generated verification environment comprises:

a predicted results unit;

a monitor unit;

at least one comparator communicatively coupled to the predicted results unit and the monitor unit; and a verification evaluation unit communicatively coupled to the comparator, the predicted results unit, and the monitor unit.

15. The computer program product stored on a non-transitory computer readable media as claimed in claim 14 wherein the Electronic Design Automation tool is configured to generate automatically the predicted results unit from the first model.

16. The computer program product stored on a non-transitory computer readable media as claimed in claim 14 wherein the Electronic Design Automation tool is configured to generate automatically the monitor unit from the second model.

17. The computer program product stored on a non-transitory computer readable media as claimed in claim 14 wherein the Electronic Design Automation tool is further configured to generate automatically an executable file driver.

18. The computer program product stored on a non-transitory computer readable media as claimed in claim 14 wherein the Electronic Design Automation tool is further configured to generate automatically an input port driver.

19. The computer program product stored on a non-transitory computer readable media as claimed in claim 14, wherein the predicted results unit comprises at least one simulated hardware component characterizing the application-specific instruction-set processor.

20. The computer program product stored on a non-transitory computer readable media as claimed in claim 19, wherein the at least one simulated hardware component characterizing the application-specific instruction-set processor comprises:

a memory;
a register;
a signal; and
a port.

21. The computer program product stored on a non-transitory computer readable media as claimed in claim 14, wherein the monitor unit comprises at least one simulated hardware component characterizing the application-specific instruction-set processor.

22. The computer program product stored on a non-transitory computer readable media as claimed in claim 21, wherein the at least one basic simulated hardware component characterizing the application-specific instruction-set processor comprises:

a memory;
a register;
a signal; and
a port.

23. The computer program product stored on a non-transitory computer readable media as claimed in claim 11, wherein the computer program product stored on a non-transitory computer readable media is adapted to be executable to implement at least the Electronic Design Automation tool.

* * * * *